(12) United States Patent
Koo et al.

(10) Patent No.: US 9,507,361 B2
(45) Date of Patent: Nov. 29, 2016

(54) INITIALIZATION SIGNAL GENERATION CIRCUITS AND SEMICONDUCTOR DEVICES INCLUDING THE SAME

(71) Applicant: SK hynix Inc., Icheon-si Gyeonggi-do (KR)

(72) Inventors: Bon Kwang Koo, Seongnam-si (KR); Jun Seop Jung, Yongin-si (KR); Yu Jong Noh, Seoul (KR); Eun Kyu In, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 20 days.

(21) Appl. No.: 14/283,915

(22) Filed: May 21, 2014

(65) Prior Publication Data

US 2015/0177763 A1   Jun. 25, 2015

(30) Foreign Application Priority Data

Dec. 19, 2013   (KR) .......................... 10-2013-0159077

(51) Int. Cl.
*G05F 1/66*   (2006.01)
*G06F 1/26*   (2006.01)

(52) U.S. Cl.
CPC .. *G05F 1/66* (2013.01); *G06F 1/26* (2013.01)

(58) Field of Classification Search
CPC ....... H01L 29/24; H01L 29/26; H01L 29/51; H01L 27/108; H01L 29/517; H01L 21/467; H01L 21/0217
USPC .................................. 327/108, 109, 110, 112
See application file for complete search history.

(56) References Cited

U.S. PATENT DOCUMENTS

| | | | |
|---|---|---|---|
| 7,282,989 B2 * | 10/2007 | Byeon ..................... | G05F 1/465 327/541 |
| 2008/0042730 A1 * | 2/2008 | Kang ............................ | 327/536 |
| 2011/0157976 A1 * | 6/2011 | Kuriyama ............... | G05F 1/563 365/185.2 |

FOREIGN PATENT DOCUMENTS

| KR | 1020070050113 A | 5/2007 |
|---|---|---|
| KR | 1020120081515 A | 7/2012 |

* cited by examiner

*Primary Examiner* — John Poos
(74) *Attorney, Agent, or Firm* — William Park & Associates Ltd.

(57) ABSTRACT

The initialization signal generation circuit includes a first driver and a second driver. The first driver includes at least one passive element and drives an initialization signal while a level of an external voltage signal reaches an initial level. The second driver drives the initialization signal in response to a control signal from a point of time that a level of the external voltage signal reaches the initial level.

17 Claims, 4 Drawing Sheets

3

INITIALIZATION SIGNAL GENERATION CIRCUITS AND SEMICONDUCTOR DEVICES INCLUDING THE SAME

CROSS-REFERENCE TO RELATED APPLICATION

The present application claims priority under 35 U.S.C. 119(a) to Korean Application No. 10-2013-0159077, filed on Dec. 19, 2013, in the Korean Intellectual Property Office, which is incorporated herein by reference in its entirety as set forth in full.

BACKGROUND

1. Technical Field

Embodiments of the invention relate to semiconductor integrated circuits and, more particularly, to initialization signal generation circuits and semiconductor devices including the same.

2. Related Art

Semiconductor devices may receive an external voltage signal VDD supplied from an external system to operate.

SUMMARY

According an embodiment, an initialization signal generation circuit includes a first driver and a second driver. The first driver may be suitable for including at least one passive element and suitable for driving an initialization signal while a level of an external voltage signal reaches an initial level. The second driver may be suitable for driving the initialization signal in response to a control signal from a point of time that a level of the external voltage signal reaches the initial level.

According to an embodiment, a semiconductor device includes an initialization signal generation circuit and an internal circuit. The initialization signal generation circuit may be suitable for generating a control signal enabled if a level of an external voltage signal reaches a target level. The initialization signal generation circuit may be suitable for driving an initialization signal until a level of the external voltage signal increases to reach an initial level. In addition, the initialization signal generation circuit may be suitable for driving the initialization signal in response to the control signal from a point of time that a level of the external voltage signal reaches the initial level. The internal circuit may be suitable for executing an initialization operation in response to the initialization signal.

According to an embodiment, a semiconductor device includes an initialization signal generation circuit and an internal circuit. The initialization signal generation circuit is suitable for generating a control signal enabled if a level of a first external voltage signal reaches a first target level and a level of a second external voltage signal reaches a second target level. The initialization signal generation circuit may also be suitable for driving an initialization signal until a level of the first external voltage signal reaches an initial level. Further, the initialization signal generation circuit may be suitable for driving the initialization signal in response to the control signal from a point of time that a level of the first external voltage signal reaches the initial level. The internal circuit is suitable for executing an initialization operation in response to the initialization signal.

According to an embodiment, the control signal is enabled and the initialization signal is driven to a level of the ground voltage signal in response to the first external voltage signal reaching the first target level and the second external voltage signal reaching the second target level.

DETAILED DESCRIPTION

Various embodiments of the inventive concept will be described hereinafter with reference to the accompanying drawings. However, the embodiments described herein are for illustrative purposes only and are not intended to limit the scope of the inventive concept. A level of an external voltage signal may gradually increase with a certain slope from a ground voltage to a target voltage. If internal operations of a semiconductor device are executed while the level of the external voltage signal VDD increases to a target voltage, the semiconductor device may malfunction due to an unstable level of the external voltage signal VDD. Therefore, during a power-up period that the level of the external voltage signal VDD increases, the semiconductor device may interrupt execution of their internal operations. Accordingly, the semiconductor device may generate an initialization signal to execute an initialization operation.

Figure 1:
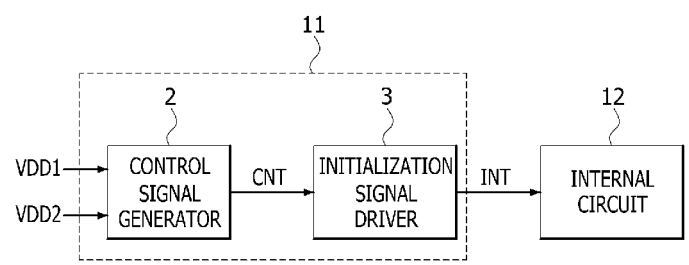
FIG. 1 is a block diagram illustrating a semiconductor device according to an embodiment of the inventive concept.

Referring to FIG. 1, a semiconductor device according to an embodiment may include an initialization signal generation circuit 11 and an internal circuit 12. Further, the initialization signal generation circuit 11 may comprise a control signal generator 2 and an initialization signal driver 3.

The control signal generator 2 may detect levels of a first external voltage signal VDD1 and a second external voltage signal VDD2 in order to generate a control signal CNT. For instance, the control signal generator 2 may generate the control signal CNT enabled at a logic "high" level when a level of the first external voltage signal VDD1 increases to reach a first target level. The control signal generator 2 may also generate the control signal CNT when a level of the second external voltage signal VDD2 increases to reach a second target level. The first target level and the second target level may be set to be different according to various embodiments. In various embodiments, the control signal generator 2 may be suitable for detecting only a single external voltage signal to generate the control signal CNT.

The initialization signal driver 3 may drive an initialization signal INT according to the control signal CNT. The initialization signal driver 3 may also drive the initialization signal INT with a level of the first external voltage signal VDD1 through a passive element 31. Moreover, the initialization signal driver 3 may drive the initialization signal INT until a level of the first external voltage signal VDD1 increases to reach an initial level. The initialization signal driver 3 may also drive the initialization signal INT to have a level of the first external voltage signal VDD1. The initialization signal driver 3 may drive the initialization signal INT from a point of time that a level of the first external voltage signal VDD1 increases to the initial level until a level of the first external voltage signal VDD1 increases to the first target level. The initialization signal driver 3 may also drive the initialization signal INT to have a level of a ground voltage signal VSS after a level of the first external voltage signal VDD1 increases to reach the first target level. In various embodiments, the initialization signal driver 3 may be configured to be driven by the second external voltage signal VDD2.

The internal circuit 12 may execute an initialization operation according to the initialization signal INT. The initialization operation may configure internal nodes to predetermined levels before a normal operation.

Figure 2:
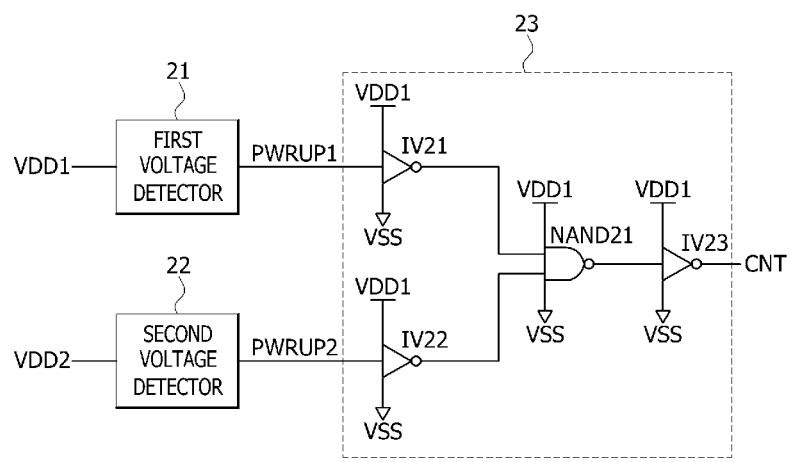
FIG. 2 is a schematic view illustrating an example of a control signal generator included in the semiconductor device of FIG. 1.

Referring to FIG. 2, the control signal generator 2 may include a first voltage detector 21, a second voltage detector 22, and a signal synthesizer 23.

The first voltage detector 21 may generate a first power-up signal PWRUP1 with a level changed from a logic "high" level to a logic "low" level when a level of the first external voltage signal VDD1 is increased to the first target level. The second voltage detector 22 may generate a second power-up signal PWRUP2 with a level changed from a logic "high" level to a logic "low" level when a level of the second external voltage signal VDD2 is increased to the second target level. The signal synthesizer 23 may comprise inverters IV21, IV22 and IV23 and a NAND gate NAND21. The signal synthesizer 23 may generate the control signal CNT enabled with a logic "high" level when the first and second power-up signals PWRUP1 and PWRUP2 have a logic "low" level. In an embodiment, a level of the first external voltage signal VDD1 may increase to the first target level after a level of the second external voltage signal VDD2 increases to the second target level. A logical operation of the first and second power-up signals PWRUP1 and PWRUP2 to obtain the control signal CNT may be different according to various embodiments.

Figure 3:
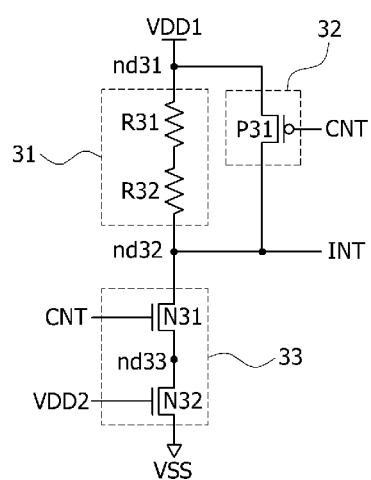
FIG. 3 is a circuit diagram illustrating an example of an initialization signal driver included in the semiconductor device of FIG. 1.

Referring to FIG. 3, the initialization signal driver 3 may include a first driver 31, a second driver 32 and a third driver 33. The first driver 31 may include resistors R31 and R32 electrically coupled in series between a node ND31 to which the first external voltage signal VDD1 is supplied and a node ND32 through which the initialization signal INT is outputted. The first driver 31 may drive the initialization signal INT with a level of the first external voltage signal VDD1 until a level of the first external voltage signal VDD1 increases to the initial level. The initial level may be set to be higher than a voltage level of the control signal CNT by a threshold voltage of a PMOS transistor P31. The second driver 32 may include the PMOS transistor P31 electrically coupled between the node ND31 and the node ND32. In addition, the PMOS transistor P31 may drive the initialization signal INT to a level of the first external voltage signal VDD1 according to the control signal CNT. When the PMOS transistor P31 is turned on, an on-resistance value (i.e., a channel resistance value) of the PMOS transistor P31 may be less than a total resistance value of the resistors R31 and R32. The resistors R31 and R32 may be electrically coupled in series. While the control signal CNT is disabled to have a logic "low" level, the second driver 32 may drive the initialization signal INT to have a level of the first external voltage signal VDD1 from when a level of the first external voltage signal VDD1 increases to the initial level until a level of the first external voltage signal VDD1 increases to reach the first target level. The third driver 33 may include an NMOS transistor N31 and an NMOS transistor N32. The NMOS transistor N31 may be electrically coupled between the node ND32 and a node ND33. Further, the NMOS transistor N31 may be turned on in response to the control signal CNT. The NMOS transistor N32 may be electrically coupled between the node ND33 and a ground voltage VSS terminal. In addition, the NMOS transistor N32 may be turned on in response to the second external voltage signal VDD2. As described above, if the first external voltage signal VDD1 increases to the first target level and the second external voltage signal VDD2 increases to the second target level, the control signal generator 2 may generate the control signal CNT enabled to have a logic "high" level. In such an instance, the NMOS transistor N31 may be turned on in response to the control signal CNT. In addition, the NMOS transistor N32 may be turned on in response to the second external voltage signal VDD2. Thus, the third driver 33 may drive the initialization signal INT to have a level of the ground voltage signal VSS.

Operations of the initialization signal driver 3 illustrated in FIG. 3 will be described hereinafter in conjunction with various examples. An example will be that the initialization signal driver 3 may operate for a first period until a level of the first external voltage signal VDD1 increases to reach the initial level. An example will also be for a second period that a level of the first external voltage signal VDD1 may increase from the initial level to the first target level. Further, an example may be for a third period after a level of the first external voltage signal VDD1 reaches the first target level.

Until a level of the first external voltage signal VDD1 reaches the initial level, the control signal CNT may be generated with a logic "low" level. In addition, the PMOS transistor P31 and the NMOS transistor N31 may be turned off. Thus, the initialization signal INT may be driven to have a level of the first external voltage signal VDD1 through the first driver 31 including the resistors R31 and R32. The resistors R31 and R32 may correspond to passive elements.

Next, while a level of the first external voltage signal VDD1 increases from the initial level to the first target level, the control signal CNT may also be generated to have a logic "low" level. Further, the PMOS transistor P31 may be turned on and the NMOS transistor N31 may be turned off. Accordingly, the initialization signal INT may be driven to have a level of the first external voltage signal VDD1 through the PMOS transistor P31 which is turned on.

Finally, after a level of the first external voltage signal VDD1 reaches the first target level and a level of the second external voltage signal VDD2 reaches the second target level, the control signal CNT may be generated with a logic "high" level. Therefore, the PMOS transistor P31 may be turned off and both the NMOS transistors N31 and N32 may be turned on. Accordingly, the initialization signal INT may be driven to have a level of the ground voltage signal VSS through the NMOS transistors N31 and N32 which are turned on.

Figure 4:
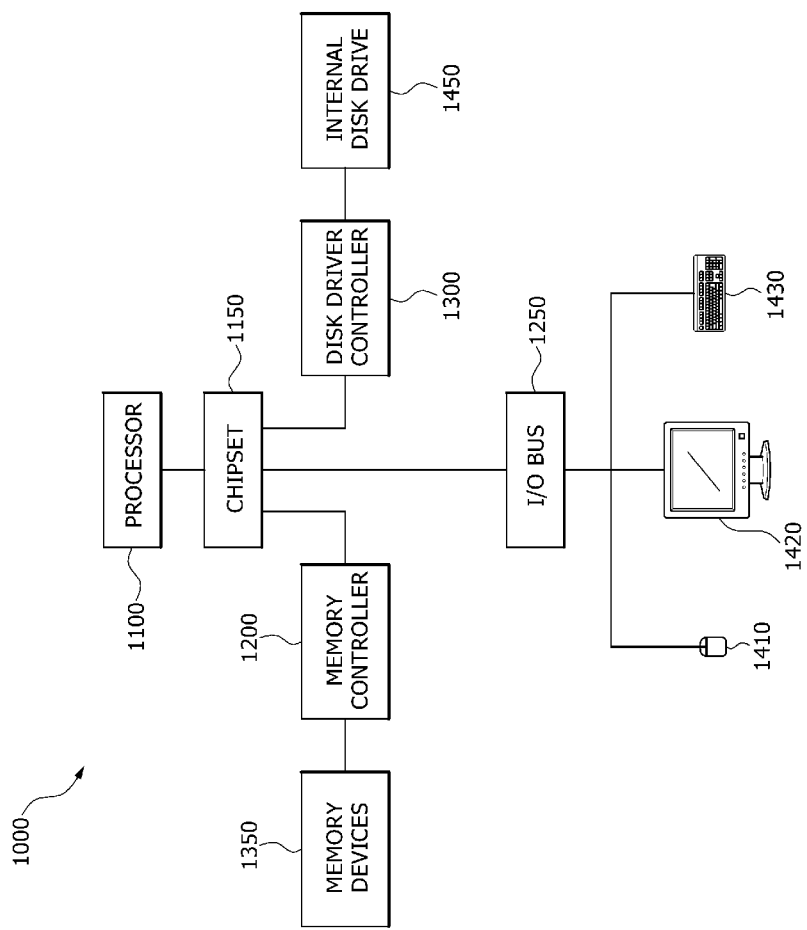
FIG. 4 illustrates a block diagram of a system employing a memory controller circuit in accordance with an embodiment of the invention.

Referring to FIG. 4, a system 1000 may include one or more processors 1100. The processor 1100 may be used individually or in combination with other processors. A chipset 1150 may be electrically coupled to the processor 1100. The chipset 1150 is a communication pathway for signals between the processor 1100 and other components of the system 1000. Other components of the system 1000 may include a controller 1200, an input/output ("I/O") bus 1250, and a disk drive controller 1300. Depending on the configuration of the system 1000, any of a number of different signals may be transmitted through the chipset 1150.

The memory controller 1200 may be electrically coupled to the chipset 1150. The memory controller 1200 can receive a request provided from the processor 1100 through the chipset 1150. The memory controller 1200 may also be electrically coupled to one or more memory devices 1350. The memory device 1350 may include the semiconductor device described above.

The chipset 1150 may also be electrically coupled to the I/O bus 1250. The I/O bus 1250 may serve as a communication pathway for signals from the chipset 1150 to the I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420 and 1430.

The disk drive controller 1300 may also be electrically coupled to the chipset 1150. The disk drive controller 1300 may serve as the communication pathway between the chipset 110 and one or more internal disk drives 1450. The disk drive controller 1300 and the internal disk drive 1450 may communicate with each other or with the chipset 1150 using virtually any type of communication protocol.

As described above, a semiconductor device according to the embodiments may stably generate an initialization signal even during an initial period that a level of an external voltage signal increases. More specifically, even before a first external voltage signal reaches an initial level, the initialization signal may be driven to have a level of the first external voltage signal without floating. Consequently, the malfunction of the semiconductor device may be prevented during an initialization operation.

What is claimed is:

1. An initialization signal generation circuit, the circuit comprising:
    a first driver suitable for including at least one passive element and suitable for driving an initialization signal while a level of an external voltage signal reaches an initial level;
    a second driver suitable for driving the initialization signal in response to a control signal from a point of time that a level of the external voltage signal reaches the initial level; and
    a third driver suitable for driving the initialization signal to a ground voltage level in response to the control signal from a point of time that a level of the external voltage signal reaches a target level.

2. The circuit of claim 1, wherein the at least one passive element is a resistor.

3. The circuit of claim 1, wherein the control signal is enabled in response to a level of the external voltage signal reaching the target level.

4. The circuit of claim 3, wherein the target level is set to be higher than the initial level.

5. The circuit of claim 4, wherein the second driver is suitable for terminating a drive of the initialization signal until the external voltage signal reaches the target level.

6. The circuit of claim 1, wherein the second driver includes a MOS transistor turned on in response to the control signal to drive the initialization signal.

7. The circuit of claim 6, wherein the initial level is set to be higher than a voltage level of the control signal by a threshold voltage of the MOS transistor constituting the second driver.

8. The circuit of claim 1, wherein the first and second drivers are suitable for driving the initialization signal to have a level of the external voltage signal.

9. A semiconductor device comprising:
    an initialization signal generation circuit suitable for generating a control signal enabled if a level of an external voltage signal reaches a target level, suitable for driving an initialization signal until a level of the external voltage signal reaches an initial level, and suitable for driving the initialization signal in response to the control signal from a point of time that a level of the external voltage signal reaches the initial level; and
    an internal circuit suitable for executing an initialization operation in response to the initialization signal,
    wherein the initialization signal generation circuit comprises a first driver, a second driver and a third driver, and
    wherein the third driver is suitable for driving the initialization signal to a ground voltage level in response to the control signal from a point of time that a level of the external voltage signal reaches the target level.

10. The semiconductor device of claim 9, wherein the initialization signal generation circuit includes a first driver including a passive element to drive the initialization signal while a level of the external voltage signal reaches the initial level.

11. The semiconductor device of claim 10, wherein the target level is set to be higher than the initial level.

12. The semiconductor device of claim 11, wherein the initialization signal generation circuit further comprises:
    a second driver suitable for driving the initialization signal in response to the control signal while a level of the external voltage signal increases from the initial level to the target level.

13. The semiconductor device of claim 12, wherein the second driver includes a MOS transistor turned on in response to the control signal to drive the initialization signal.

14. The semiconductor device of claim 13, wherein the initial level is set to be higher than a voltage level of the control signal by a threshold voltage of the MOS transistor constituting the second driver.

15. A semiconductor device comprising:
    an initialization signal generation circuit suitable for generating a control signal enabled if a level of a first external voltage signal reaches a first target level and a level of a second external voltage signal reaches a second target level, suitable for driving an initialization signal until a level of the first external voltage signal reaches an initial level, and suitable for driving the initialization signal in response to the control signal from a point of time that a level of the first external voltage signal reaches the initial level; and
    an internal circuit suitable for executing an initialization operation in response to the initialization signal,
    wherein the initialization signal generation circuit comprises a first driver and a second driver, and the first driver and the second driver are coupled in parallel between a first node to which the first external voltage signal is supplied and a second node through which the initialization signal is outputted.

16. The semiconductor device of claim 15, wherein the initialization signal generation circuit comprises:
    a first driver including a passive element to drive the initialization signal while a level of the first external voltage signal reaches the initial level.

17. The semiconductor device of claim 16, wherein the initialization signal generation circuit further comprises:
    a second driver suitable for driving the initialization signal in response to the control signal while a level of the first external voltage signal increases from the initial level to the first target level.

* * * * *